Patented Mar. 31, 1936

2,036,137

UNITED STATES PATENT OFFICE 2,036,137

PROCESS OF PREPARATION OF DICHLORACETIC ACID

Alfred Guyot, Salindres, France, assignor to "Compagnie de Produits Chimiques et Electrometallurgiques Alais, Froges et Camargue," Paris, France, a corporation of France No Drawing. Application August 3, 1934, Serial No. 738,381. In France August 17, 1933

4 Claims. (Cl. 260—113)

I have ascertained that dichloracetic acid is obtained in a high state of purity and with excellent yields, when pentachlorethane is heated in presence of concentrated sulphuric acid.

The reaction may be represented by the following equation:

$$CCl_3\text{—}CHCl_2 + 2H_2O = CHCl_2\text{—}COOH + 3HCl.$$

It is necessary however to operate with a sulphuric acid of which the concentration shall be comprised within certain limits; with too dilute an acid, there is no reaction, and with too concentrated an acid, there is evolution of carbon dioxide, carbon monoxide and sulphurous acid, and the yields diminish greatly.

The concentration of the sulphuric acid must not be lower than about 88 percent; in particular, a sulphuric acid of a concentration approximating 97 percent of $H_2SO_4$ (the difference from 100 being represented by water) is perfectly suitable.

As the water is consumed by the very mechanism of the reaction, the concentration of the sulphuric acid would go on increasing and there would soon be observed an evolution of gas with decrease of the yield, if care were not taken to add water periodically in proportion as the latter is consumed, as is indicated in the example hereafter.

The reaction temperature varies with the concentrations of the acid brought into action. In general, it is comprised between 130° and 170° C.

In order to facilitate the contact of the acid and the chlorinated hydrocarbon, it is well to stir energetically during the whole course of the operation.

In order to isolate the dichloracetic acid formed, it suffices to pour the product of the reaction upon ice, to separate by decantation the pentachlorethane which has not reacted, and to extract the aqueous solution with ether or other solvent.

It is also possible, more simply, to subject the crude product of the reaction to distillation in vacuo. There passes first the pentachlorethane which has not reacted, then the dichloracetic acid in a high state of purity. The sulphuric acid which remains in the distillation boiler still contains a very small quantity of dichloracetic acid and can be employed without purification for a fresh operation.

Many other ways of causing the pentachlorethane to react upon the sulphuric acid can be imagined, while remaining within the limits of the invention; the example below has therefore no limiting effect.

Example

Into a boiler, provided with a mechanical stirrer, a reflux cooler, a thermometer pocket and suitable pipe connections, there are introduced: 1400 parts of pentachlorethane, and 1000 parts of sulphuric acid at (a strength of) 66° Beaumé.

The stirrer is set in motion and the contents of the boiler are raised to and maintained at about 168° C.

There is observed a regular evolution of hydrochloric acid, which is fairly slow at first and which then goes on accelerating. This hydrochloric acid is absorbed by passage into a tower sprayed with water, placed at the exit from the reflux cooler.

After absorption of the acid, there must not be found, in normal working, any appreciable evolution of gas, which would be the indication of a shortage of water as has been explained above.

However, since there is a consumption of water in the course of the reaction, there should come a time when, the concentration of the sulphuric acid becoming too high, an evolution of gas would be observed. It is therefore advisable to maintain the concentration of the acid at a suitable figure by addition of water or aqueous sulphuric acid. In order to render the process continuous, it suffices to withdraw periodically a certain volume of the reaction liquid, so as to maintain constant the level in the boiler, and to add a quantity of pentachlorethane corresponding to that (which has) entered into reaction.

The liquid withdrawn, subjected to distillation in vacuo, thus furnishes from the very outset dichloracetic acid at (a strength of) 98 percent, with a yield of 90 percent on the pentachlorethane brought into action.

What I claim is:

1. A process of manufacture of dichloracetic acid, consisting in causing to react pentachlorethane with sulphuric acid containing water of a concentration higher than 88 per cent.

2. A process of manufacture of dichloracetic acid, consisting in causing to react pentachlorethane with sulphuric acid containing water of a concentration higher than 88 per cent at a temperature comprised between 130 and 170° C.

3. A process of manufacture of dichloracetic acid, consisting in causing to react pentachlorethane with sulphuric acid of a concentration of about 97 per cent.

4. A process of manufacture of dichloracetic acid, consisting in causing to react pentachlorethane with sulphuric acid containing water of a concentration higher than 88 per cent, and in maintaining said concentration by adding water in proportion as the latter is consumed by the reaction.

ALFRED GUYOT.